United States Patent
Zaghloul et al.

(10) Patent No.: US 8,004,734 B2
(45) Date of Patent: Aug. 23, 2011

(54) OPTICAL LOGIC DEVICES HAVING POLARIZATION-BASED LOGIC LEVEL REPRESENTATION AND METHOD OF DESIGNING THE SAME

(76) Inventors: Yasser A. Zaghloul, Atlanta, GA (US); Abdel Rahman M Zaghloul, Pooler, GA (US)

( * ) Notice: Subject to any disclaimer, the term of this patent is extended or adjusted under 35 U.S.C. 154(b) by 794 days.

(21) Appl. No.: 11/804,595

(22) Filed: May 18, 2007

(65) Prior Publication Data

US 2007/0297034 A1    Dec. 27, 2007

Related U.S. Application Data

(60) Provisional application No. 60/747,656, filed on May 18, 2006, provisional application No. 60/747,901, filed on May 22, 2006, provisional application No. 60/827,630, filed on Sep. 29, 2006.

(51) Int. Cl.
*G02F 3/00* (2006.01)
(52) U.S. Cl. ...................................... 359/108
(58) Field of Classification Search .................. 359/107, 359/108
See application file for complete search history.

(56) References Cited

U.S. PATENT DOCUMENTS

| | | | |
|---|---|---|---|
| 4,863,247 A | 9/1989 | Lasher | |
| 4,932,739 A | 6/1990 | Islam | |
| 5,388,088 A | 2/1995 | Gans et al. | |
| 6,671,423 B1 | 12/2003 | Fujimoto et al. | |
| 2002/0054404 A1 | 5/2002 | Hedekvist et al. | |
| 2003/0202798 A1 | 10/2003 | Chou et al. | |
| 2004/0208571 A1 | 10/2004 | Shahar et al. | |
| 2004/0208618 A1 | 10/2004 | Roberts et al. | |
| 2005/0089265 A1 | 4/2005 | Ide | |
| 2005/0264820 A1 | 12/2005 | Podoleanu et al. | |

OTHER PUBLICATIONS

Invitation to Pay Additional Fees And, Where Applicable, Protest Fee from corresponding International Application No. PCT/US 07/11892.
Torroba et al., Digital Polarization-Encoding Technique for Optical Logic Operations, Optics Letters, vol. 21, No. 23, Dec. 1, 1996, pp. 1918-1920.
International Search Report dated Apr. 3, 2009; International Application No. PCT/US07/11892, international filed—May 18, 2007.
Written Opinion dated Apr. 3, 2009 of International Application No. PCT/US07/11892, international filing date—May 18, 2007.
Adolf W. Lohmann, Polarization and Optical Logic, May 15, 1986, pp. 1594-1597, vol. 25, No. 10, Applied Optics.

(Continued)

*Primary Examiner* — Alessandro Amari
(74) *Attorney, Agent, or Firm* — Charlena L. Thorpe, Esq.; Law Off Charlena Thorpe Inc.

(57) ABSTRACT

Apparatus and methods for implementing logical operations using polarization-based logic level representation is provided. An apparatus and method split an input polarized beam into a first beam and a second beam, wherein the first beam and the second beam have an identical or nearly identical relative polarization angle that equals or nearly equals the relative polarization angle of the input polarized beam. The apparatus and method further polarize at a first relative polarization angle the first beam and polarize at a second relative polarization angle the second beam. The ratio of the amplitudes of two perpendicular polarization components of the input polarized beam is one or nearly one and the difference between the first relative polarization angle and the second relative polarization angle is 180 degrees or nearly 180 degrees. Furthermore, the relative polarization angle of the input polarized beam equals or nearly equals either the first relative polarization angle or the second relative polarization angle.

21 Claims, 8 Drawing Sheets

OTHER PUBLICATIONS

Ahmed et al., Polarization-Encoded Optical Shadow-Casting Arithmetic-Logic-Unit Design: Separate and Simultaneous Output Generation, Sep. 10, 1992, vol. 31, No. 26, Applied Optics.
Alam et al., Multiple-Valued Logic Unit Design Using Polarization-Encoded Optical Shadow-Casting, Book, 1993, vol. 25, No. 1, Optics & Laser Technology.
Habli et al., Polarization-Coded Optical Logic Gates for N-inputs, Book, 1992, pp. 100-102, vol. 91, No. 3, Optik.
Handschy et al., Polarization-Based Optical Parallel Logic Gate Utilizing Ferroelectric Liquid Crystals, Aug. 1987, pp. 611-613, vol. 12, No. 8, Optics Letters.
Karim et al., Polarization-Encoded Optical Shadow-Casting Logic Units: Design, Jul. 15, 1987, pp. 2720-2725, vol. 26, No. 14, Applied Optics
Kumar et al., Polarization-Based Optical Logic Using Laser-Excited Gratings, Feb. 15, 1990, pp. 245-247, vol. 15, No. 4, Optics Letters.
Lohmann et al., Spatial Filtering Logic Based on Polarization, Jan. 1, 1987, pp. 131-135, vol. 26, No. 1, Applied Optics.
Nishimura et al., Analysis and Evaluations of Logical Instructions Called in Parallel Digital Optical Operations Based on Optical Array Logic, May 10, 2003, pp. 2532-2545, vol. 42, No. 14, Applied Optics.
Peng et al., Integrated Polarization-Optical Logic Processor, Book, Nov. 15, 1994, pp. 131-135, Optics Communications.
Torroba et al., Digital Polarization-Encoding Technique for Optical Logic Operations, Dec. 1, 1996, pp. 1918-1920, vol. 21, No. 23, Optics Letters.
Wu et al., Polarization-Encoded Optical Logic Operations in Photorefractive Media, Oct. 15, 1993, pp. 1742-1744, vol. 18, No. 20, Optics Letters.
Yousef et al., Ellipsometric Function of a Film-Substrate System: Characterization and Detailed Study, Journal, Mar. 1989, pp. 355-366, vol. 6, No. 3, Journal of the Optical Society of America.
Yu et al., An Improved Polarization-Encoded Logic Algebra (PLA) Used for the Design of an Optical Logic Gate for a 2D Data Array: Theory, Book, 585-596, Apr. 1, 1995, Optics Communications.
Zaghloul et al., Complete All-Optical Processing Polarization-Based Binary Logic Gates and Optical Processors, Oct. 16, 2006, pp. 9879-9895, vol. 14, No. 21, Optics Express.
Zaghloul et al., Design of Film-Substrate Single-Reflection Retarders, Journal, Sep. 1975, pp. 1043-1049, vol. 65, No. 9, Journal of the Optical Society of America.
Zaghloul et al., Design of Reflection Retarders by Use of Nonnegative Film-Substrate Systems, Journal, Aug. 2005, pp. 1637-1645, vol. 22, No. 8, Journal of the Optical Society of America.
Zaghloul et al., Thin-Film Coatings—a Transmission Ellipsometric Function Approach: I. Nonnegative Transmission Systems, Polarization Devices, Coatings, and Closed-Form Design Formulas, Dec. 10, 2006, pp. 8916-8931, vol. 45, No. 35, Applied Optics.

OPTICAL LOGIC DEVICES HAVING POLARIZATION-BASED LOGIC LEVEL REPRESENTATION AND METHOD OF DESIGNING THE SAME

CROSS REFERENCE TO RELATED APPLICATION

This application claims priority to U.S. Provisional Application No. 60/747,656, filed on May 18, 2006, U.S. Provisional Application No. 60/747,901, filed on May 22, 2006, and U.S. Provisional Application No. 60/827,630, filed on Sep. 29, 2006, which all are incorporated herein by reference.

FIELD OF THE INVENTION

Embodiments of the present invention relate generally to binary logic gates using polarization-based logic state representation.

BACKGROUND OF THE INVENTION

Binary logic gates implement logical operations on logic inputs to produce a logic output. The logic level (or state) of each logic input and output is either 0 (i.e., low) or 1 (i.e. high). In electrical systems, the logic level of an input or output is represented by its voltage level where typically a low voltage represents a logic 0 and a high voltage represents a logic 1. Similarly, prior art optical systems represent logic levels based on the intensity of the input/output electromagnetic wave. The only polarization-based logic level representation disclosed in the prior art utilizes a parallel/horizontal polarized electromagnetic wave, which has a relative polarization angle of zero, and a perpendicular/vertical polarized electromagnetic wave, which has a relative polarization angle of 90°, to represent the two logic levels in an optical system.

Optical gates that use intensity-based representations of logic levels to perform logical operations require regeneration of the output electromagnetic wave prior to cascading these gates. Additionally, existing optical gates include costly components such as uniaxial crystals, nonlinear optical elements, and semiconductor-type photodetectors. Still further, prior art optical gates are inefficient in that they implement complicated parallel procedures and do not operate at optimal speed.

Accordingly, there is a need for an optical gate that uses a polarization-based logic level representation based on any polarization angle of an electromagnetic wave to perform logical operations in a cost effective and computationally simplified manner.

SUMMARY OF THE INVENTION

Apparatus and methods for implementing logical operations using polarization-based logic level representation is provided. In one embodiment, there is provided an apparatus and method that split an input polarized beam into a first beam and a second beam, wherein the first beam and the second beam have an identical or nearly identical relative polarization angle that equals or nearly equals the relative polarization angle of the input polarized beam. The apparatus and method further polarize at a first relative polarization angle the first beam and polarize at a second relative polarization angle the second beam. The ratio of the amplitudes of two perpendicular polarization components of the input polarized beam is one or nearly one and the difference between the first relative polarization angle and the second relative polarization angle is 180 degrees or nearly 180 degrees. Furthermore, the relative polarization angle of the input polarized beam equals or nearly equals either the first relative polarization angle or the second relative polarization angle.

In another embodiment, there is provided an apparatus and method that receives an input polarized beam having a first relative amplitude and a first relative polarization angle, wherein the input polarized beam represents a first logic state or a second logic state based on the first relative polarization angle. The apparatus and method split the input polarized beam into a first beam and a second beam, wherein the first beam and the second beam equal or nearly equal and represent the same logic state as the input polarized beam. The apparatus and method optically eliminate the first beam if the relative polarization angle of the first beam represents the second logic state; and optically eliminating the second beam if the relative polarization angle of the second beam represents the first logic state.

Although described above in the context of a method, other embodiments of the present invention are embodied as an apparatus and/or a computer program product. In this regard, an apparatus according to one embodiment of the present invention includes a memory for designing general processor to implement Boolean function, and a processor, in communication with the memory, configured to perform the functions set forth above. As to the computer program product, the computer program product includes at least one computer-readable storage medium having computer-readable program code portions stored therein with the computer-readable program code portions including executable portions configured to perform the functions set forth above.

Advantages of the invention will be set forth in part in the description which follows, and in part will be obvious from the description, or may be learned by practice of the invention. The advantages of the invention will be realized and attained by means of the elements and combinations particularly pointed out in the appended claims.

Both the foregoing general description and the following detailed description are exemplary and explanatory only and are not restrictive of the invention, as claimed.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
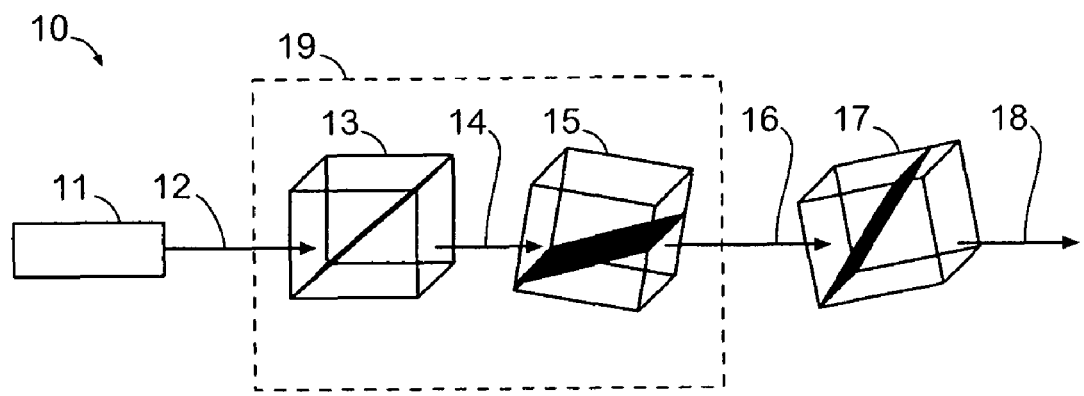
FIG. 1 illustrates an exemplary collection of optical devices including a general two-electronic-signal (TES) binary gate cascaded to process an input beam.

FIG. 1 illustrates a general two-electronic-signal (TES) binary gate architecture, constructed of a collection of optical devices that are cascaded together. Each device is a thin-film polarization device, or an electro-optic device, that is designed to take two positions.

FIG. 1 illustrates a general optical system 10 according to principles of the invention, which may comprise a beam generator 11 that generates a beam 12 such as an electromagnetic wave 12 and a collection of optical devices 13, 15, 17 cascaded together to process the beam 12 and produce an output beam 18. Electromagnetic wave 12 may be of any frequency such as optical, Microwave, Radio waves, X-rays, Gama Rays.

One or more of the optical devices 13, 15, 17 may be, for example, a general polarization device (GPD) or specifically, for example, a retarder or polarizer. The GPD may comprise a thin film system (TFS) such as a film-substrate system, an unsupported film (pellicle), or a bare substrate, birefringent crystals, or may be an electro-optic device. One or more of the optical devices 13, 15, 17 also may be designed to take two positions based on a control signal. The two positions of the optical devices may produce the two logic states, e.g., logic 0 (L0) and logic 1 (L1), of the system. A pair of the optical devices 13, 15 may implement a two-electronic-signal (TES) architecture binary gate 19, discussed below.

GPDs may introduce a relative amplitude attenuation, tan $\psi$, and a relative phase shift, $\Delta$, between the two orthogonal components of the electric vector of the input electromagnetic wave 12, 14, 16 that are parallel (p) and perpendicular (s) to the plane of incidence (p-component and s-component). Retarders and polarizers are special cases of GPDs. A retarder adjusts the relative phase shift of an input beam while preserving its relative amplitude (magnitude) (i.e., tan $\psi$=1). A polarizer produces a linearly polarized light beam where the p-component and s-component are in phase in the time domain.

Regarding retarders, one or more of the optical devices 13, 15, 17 may be a thin-film reflection retarder, thin-film transmission retarder, or non-thin-film retarder.

A thin-film reflection (TFR) retarder is a thin-film device that produces a required retardation angle, $\Delta$, to an input electromagnetic wave upon reflection at the surface of the device at the design angle of incidence. TFR retarders may be realized using negative and zero film-substrate systems. For $\Delta$=0, a TFR is a polarization-preserving device (PPD), which produces an output electromagnetic wave polarization that is identical to the polarization of the input electromagnetic wave. A pellicle reflection (PR) retarder uses a pellicle, which is an unsupported (embedded) thin film, and produces the required retardation angle $\Delta$ upon reflection without introducing any relative amplitude attenuation.

A thin-film transmission (TFT) produces a required retardation angle, $\Delta$, to an input electromagnetic wave upon transmission through the device at the design angle of incidence. TFT retarders may be designed using negative, positive, and zero film-substrate systems. Similarly to TFR retarders, for $\Delta$=0, a TFR is a polarization-preserving device (PPD). A pellicle transmission (PT) retarder also uses a pellicle and has a retardation angle of $\Delta$=0, which makes it a PPD. Non-thin-film (NTF) retarders are made of birefringent crystals and produce a retardation angle based on the direction of propagation of an input beam within the crystal with reference to its optic axis.

Regarding polarizers, similar to retarders, thin-film (TF) polarizers are of two main types, reflection and transmission. Each type is either constructed of a film-substrate system or of a pellicle (unsupported film). A p-suppressing polarizer (PSP) eliminates the p-component of the electromagnetic wave upon interacting with the device. A s-suppressing polarizer (SSP) eliminates the s-component of the electromagnetic wave. A linear-partial polarizer (LPP) produces a relative amplitude attenuation to the input electromagnetic wave, in addition to 0 or 180° relative phase shift. Non-thin-film (NTF) polarizers are made of birefringent crystals. An NTF polarizer only passes the electromagnetic wave component in its polarization direction. For example, if the input wave is linearly polarized perpendicular to the polarization direction of the polarizer, the output of the polarizer is zero i.e., no wave emerges.

Figure 2:
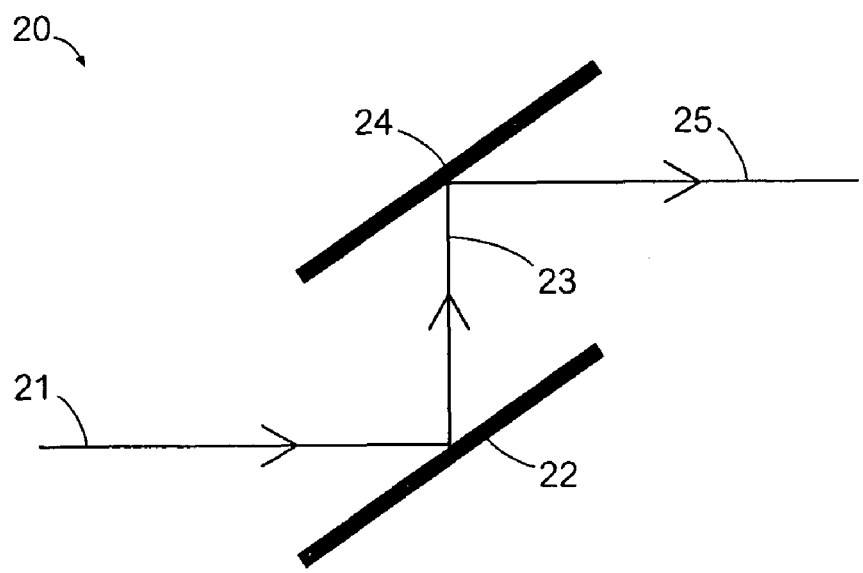
FIG. 2 illustrates a general TES binary gate wherein the input and output beams are parallel.
Figure 3:
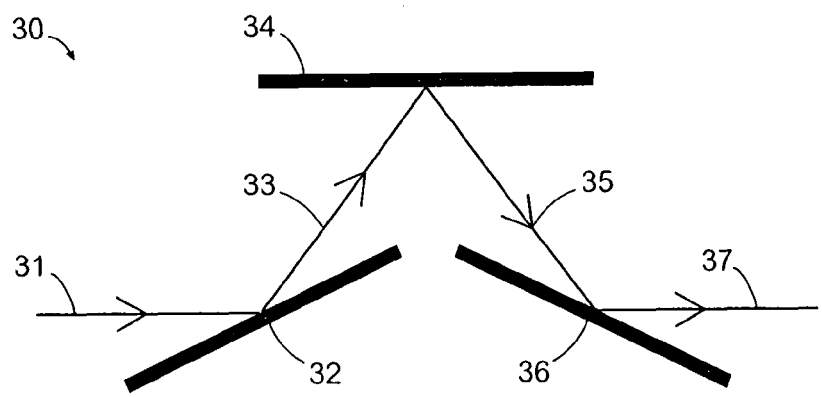
FIG. 3 illustrates a general TES binary gate cascaded with an additional optical device to produce collinear input and output beams.

FIG. 2 illustrates a gate where the input beam 21 and output beam 25 are parallel upon interaction with optical devices 22, 24. As shown in FIG. 3, if the input 31 and output 27 beams are required to be collinear, a third optical device 36 may be added. Optical device 36 may be designed to preserve the polarization properties of the beam emerging from optical device 34, or could be co-designed and co-controlled as needed with optical device 34 to perform together the function of optical device 34.

The complex $\rho$-plane may be used to represent both the polarization state of electromagnetic wave and reflection-type optical device. The complex $\rho$-plane is replaced by the complex $\tau$-plane for transmission devices. In the complex $\rho$-plane, the $\rho$ vector represents the relative phase difference and relative amplitude attenuation of the two components, p and s, of the electric vector of the electromagnetic wave. In the case of reflection from, or refraction through, a thin-film system (TFS), $$\rho = \tan \psi \exp(j\Delta). \quad (1)$$

Figure 4:
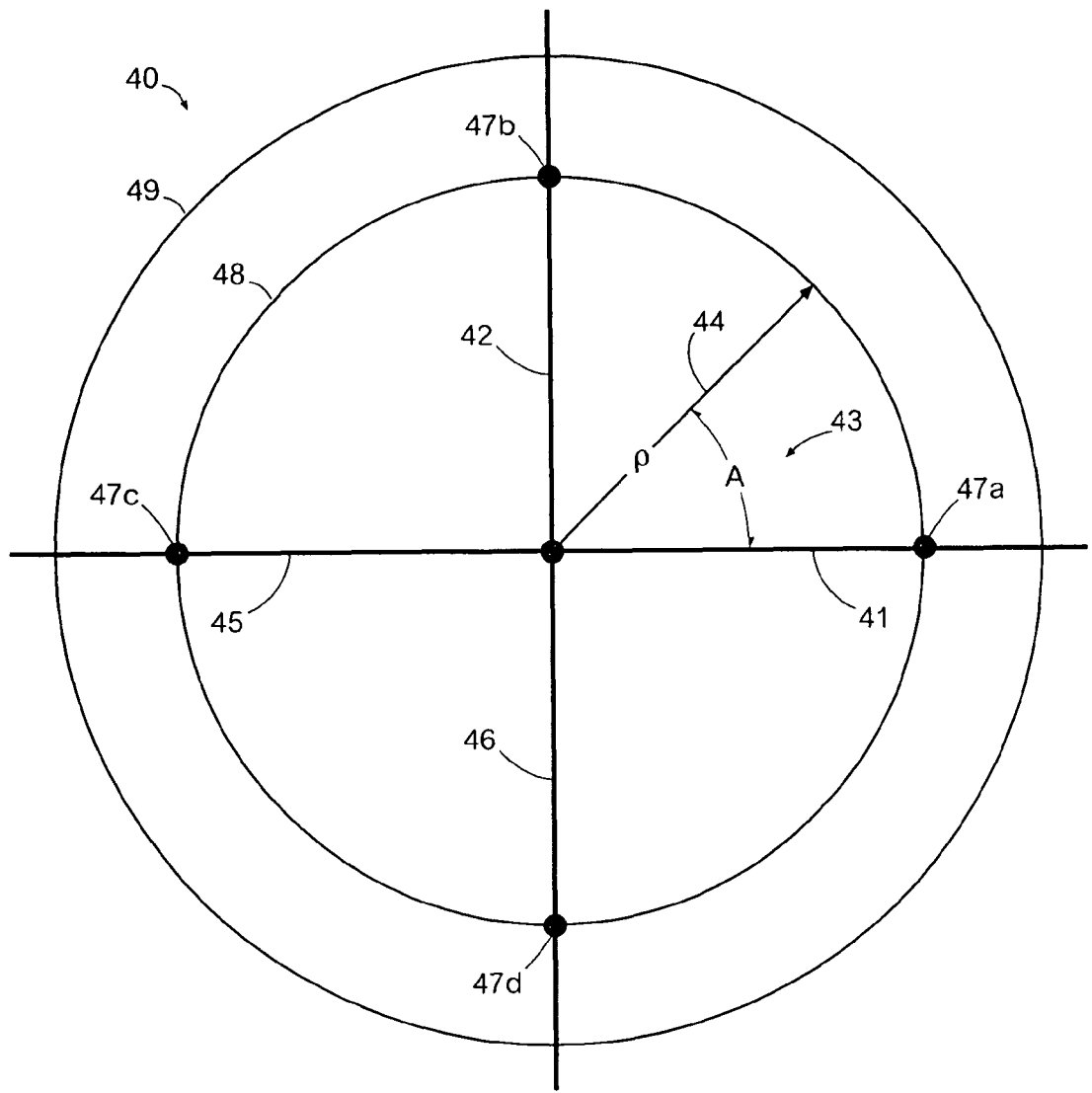
FIG. 4 illustrates the complex ρ-plane.

Referring to FIG. 4, each point in the complex $\rho$-plane represents a different state of polarization of the electromagnetic wave. The positive real axis 41 represents linearly-polarized wave, where there is a zero phase shift in the time domain between the p and s components of the wave, or light beam. The negative real axis 45 represents linearly-polarized wave, where there is a 180° phase shift in the time domain between the p and s components of the wave, or light beam.

Each point on the real axis 41, 45 represents a light beam with a different relative amplitude between the p and s components of the light beam. That relative amplitude determines the polarization angle, P, of the beam, measured counter-clockwise from the x-axis of the coordinate system. P is zero at the origin, increasing in the positive direction of the real axis 41 to +90° at infinity, and decreasing in the negative direction of the real axis 45 to −90° at negative infinity. Note that ±90° represent the same linearly polarized light. Points on the imaginary axis 42 of the complex ρ-plane represent elliptically polarized light with a phase difference in the time domain of +90° on the positive part of the imaginary axis 42 and of −90° on the negative part of the negative axis 46. Any straight line passing through the origin represents different polarization states of equal phase shift in the time domain. Accordingly, each polarization has a different relative amplitude. On the other hand, any circle with its center at the origin represents waves with different polarization states but the same relative amplitude; and accordingly of different phase shifts. The point ρ=(+1, 0) 47a represents a linearly polarized light with P=+45°, while the point ρ=(−1, 0) 47c represents a linearly polarized light with P=−45°. The points on the unit circle 48 represent retarders with different retardation angles. The point (0, +1) 47b represents right-handed circularly-polarized light, while the point (0, −1) 47d represents left-handed circularly-polarized light. Each of the two components of the two pairs of (+1, 0) and (−1, 0); and of (0, +1) and (0, −1), is orthogonal to the other.

Two polarization states are said to be orthogonal if, and only if, they satisfy the condition;

$$\rho_1^* \cdot \rho_2 = 0, \qquad (2)$$

where $\rho_1$ and $\rho_2$ are the two ρ-vectors representing the two polarization states in the complex ρ-plane. $\rho_1^*$ is the Hermitian adjoint of $\rho_1$; the transposed complex-conjugate. Accordingly, any two origin-symmetrical points on the unit circle, two points on the unit circle joined by a straight line through the origin, represent two orthogonal states. For example, each of the two components of the two pairs of (+1, 0) and (−1, 0); and of (0, +1) and (0, −1), is orthogonal to the other. In general, two points in the complex ρ-plane are orthogonal if they are joined by a straight line going through the origin and the magnitude of one is the reciprocal of the other.

As will become clear later, two points in the complex ρ-plane can be used to represent L0 and L1.

A passive-device representation of a polarization device in the complex ρ-plane is a point which represents the device's polarization state. For example, a linear partial polarizer is represented by a point on the real axis representing its relative amplitude attenuation, and a retarder is represented by a point on the unit circle representing its relative retardation angle. The representation of a device in action, active-device representation, in the complex ρ-plane reflects the effect of the interaction of the beam with the device. The interaction of a beam with a thin-film device is represented by the resultant of the vector multiplication, dot product, of the two ρ vectors representing the beam and the device. For example, if a linearly-polarized light at +45° reflects at the surface of a TFR retarder of Δ=+90° (right-handed circular retarder), the output beam is a right-handed circularly polarized light. On the other hand, if the input beam is right-handedly circularly polarized, the output beam is then a linearly polarized at −45°. Also, a left-handed circularly polarized beam comes out a TFR retarder of Δ=−90° (left-handed circular retarder) linearly polarized at +45°. The interaction of the beam with the device is represented by a ρ-vector derived using either Jones or Stokes matrix representation. For any two orthogonal polarizations, the representing ρ vectors should satisfy Eq. (2).

Logic gates using the above principles can be designed to implement logic functions. For simplicity, a linearly polarized light at +45° (i.e., point (+1, 0) in the complex ρ plane) is used to represent L1 and a linearly polarized light at a polarization angle of −45° (i.e., point (−1, 0) in the complex ρ plane) is used to represent L0.

Table 1 illustrates a truth table for an AND gate. Column A may represent an optical input and column B may represent a control input to the AND gate.

TABLE 1

| A | B | Z |
|---|---|---|
| 0 | 0 | 0 |
| 0 | 1 | 0 |
| 1 | 0 | 0 |
| 1 | 1 | 1 |

Figure 5:
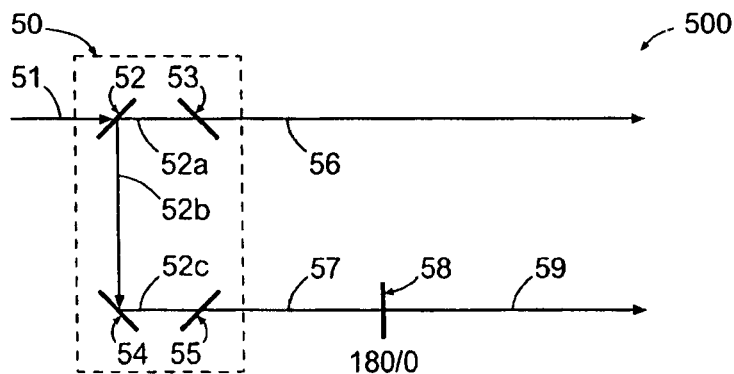
FIG. 5 illustrates an embodiment of an AND gate implementation.

FIG. 5 illustrates an embodiment of an AND gate 500 based on the principles of the present invention. An optical input 51 may be generated by a polarizer that produces a linearly polarized light at 45° representing L1 or −45° representing L0 or optical input 51 may be produced by polarization rotation using a liquid crystal. Optical input 51 corresponds to input A of Table 1. Optical input 51 is then split into two beams 52a, 52b using, for example, a beam splitter (BS). Preferably beams 52a, 52b are identical.

Beam 52a may be processed by polarizer 53 having a polarization angle of −45° angle to produce beam 56. Beam 52b may undergo processing by a optical device 54 such as a mirror to produce a beam 52c, which is preferably identical to beam 52b. Beam 52b then may be processed by polarizer 55 at 45° angle to produce beam 57. Alternatively, a properly designed mask may be used to produce beams 56, 57.

If input beam 51 is a logic 0 (i.e., polarized at −45°), beam 56 will have a polarization of −45° representing a L0, and beam 57 will be nonexistent, i.e., polarizer 55 will not produce an output beam. If input beam 51 is a logic 1 (i.e., polarized at −45°), beam 56 will be nonexistent, i.e., polarizer 53 will not produce an output beam, and beam 57 will have a polarization of 45° representing a L1. Accordingly, either, but not both, beam 56 or beam 57 will exist at a time.

Beam 57 is further processed by a retarder 58 that is controlled by a control input, which corresponds to input B in Table 1. Retarder 58 rotates the relative polarization angle of beam 57 by 180° if the control input is L0 and by 0° if the control input is L1. Because either, but not both, beam 56 or beam 57 will exist at a time, they may be steered to the same output (corresponding to column Z of Table 1) by, for example, an optical device 36 (FIG. 3), without interference.

A comparison of the operation of device 500 and Table 1 reveals that device 500 implements an AND logic operation. Referring to the first row of Table 1, when A=0 (i.e., input beam 51 has a −45 degree polarization angle) and B=0 (i.e., control input to retarder 58 is 0), Z=0 (either beam 56 or beam 59, whichever is present, is a L0; in this case, beam 56 is present and is a L0). Referring to the second row of Table 1, when A=0 and B=1 (i.e., control input to retarder 58 is 1), Z=0 (i.e., either beam 56 or beam 59, whichever is present, is a L0; in this case beam 56 is present and is a L0). Referring to the third row of Table 1, when A=1 (i.e., input beam 51 has a +45 degree polarization angle) and B=0, Z=0 (i.e., either beam 56 or beam 59, whichever is present, is a L0; in this case beam 59 is present and is a L0). Finally, referring to the fourth row of Table 1, when A=1 and B=1, Z=1 (i.e., either beam 56 or beam 59, whichever is present, is a L1; in this case beam 59 is present and is a L1).

Figure 6:
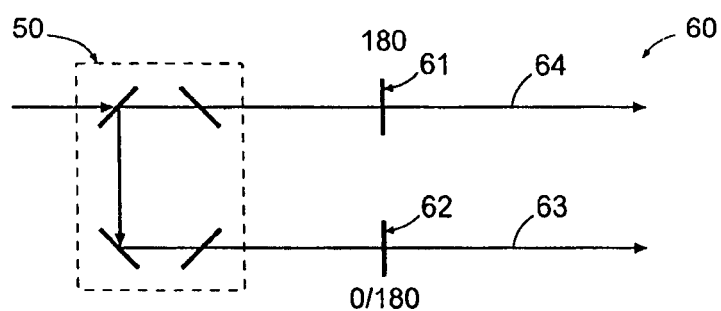
FIG. 6 illustrates an embodiment of a NAND gate implementation.

A NAND gate may be designed based on the AND gate 500 by adding a non-control inactive R that introduces a 180° angle in the complex ρ plane to the output of the AND gate 500. FIG. 6 illustrates an alternate embodiment of a NAND gate 60 based on the principles of the present invention. Table 2 illustrates a truth table for a NAND gate. Column A may represent an optical input and column B may represent a control input to the NAND gate.

TABLE 2

| A | B | Z |
|---|---|---|
| 0 | 0 | 1 |
| 0 | 1 | 1 |
| 1 | 0 | 1 |
| 1 | 1 | 0 |

Beams 56 and 57 produced by the components of processing block 50 of FIG. 5, are similarly produced in NAND gate 60. Beam 56 of FIG. 6 is further processed by an un-controlled/inactive retarder 61 that rotates the relative polarization angle of beam 56 by 180° to produce beam 64. Beam 57 of FIG. 6 is further processed by a retarder 62 that is controlled by a control input, which corresponds to input B in Table 2. Retarder 62 rotates the relative polarization angle of beam 57 by 0° if the control input is L0 and by 180° if the control input is L1 to produce beam 63. As with AND gate 500, because either, but not both, beam 63 or beam 64 will exist at a time, they may be steered to the same output (corresponding to column Z of Table 2) by, for example, an optical device 36 (FIG. 3), without interference.

A comparison of the operation of device 60 and Table 2 reveals that device 60 implements a NAND logic operation. Referring to the first row of Table 2, when A=0 and B=0 (i.e., control input to retarder 62 is 0), Z=1 (either beam 64 or beam 63, whichever is present, is a L0; in this case, beam 64 is present and is a L1). Referring to the second row of Table 2, when A=0 and B=1 (i.e., control input to retarder 62 is 1), Z=1 (i.e., either beam 64 or beam 63, whichever is present, is a L1; in this case beam 64 is present and is a L1). Referring to the third row of Table 2, when A=1 and B=0, Z=1 (i.e., either beam 64 or beam 63, whichever is present, is a L0; in this case beam 63 is present and is a L1). Finally, referring to the fourth row of Table 2, when A=1 and B=1, Z=1 (i.e., either beam 64 or beam 63, whichever is present, is a L0; in this case beam 63 is present and is a L0).

Figure 7:
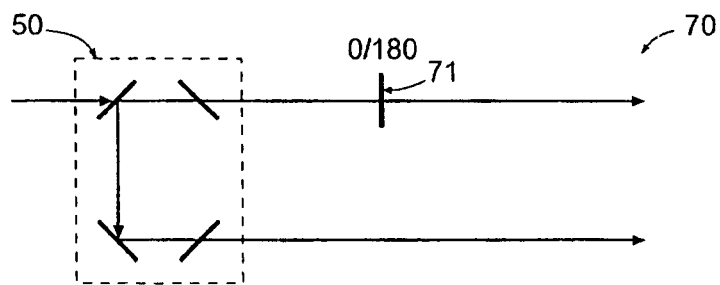
FIG. 7 illustrates an embodiment of an OR gate implementation.

An OR gate may be designed using the previous gates and inverters or using only NAND gates. FIG. 7 illustrates an alternate embodiment of an OR gate 70 based on the principles of the present invention. Table 3 illustrates a truth table for an OR gate. Column A may represent an optical input and column B may represent a control input to the OR gate.

TABLE 3

| A | B | Z |
|---|---|---|
| 0 | 0 | 0 |
| 0 | 1 | 1 |
| 1 | 0 | 1 |
| 1 | 1 | 1 |

Beams 56 and 57 produced by the components of processing block 50 of FIG. 5, are similarly produced in OR gate 70. Beam 56 of FIG. 7 is further processed by by a retarder 71 that is controlled by a control input, which corresponds to input B in Table 3. Retarder 71 rotates the relative polarization angle of beam 56 by 0° if the control input is L0 and by 180° if the control input is L1 to produce beam 72. As with AND gate 500, because either, but not both, the beam 72 or beam 57 will exist at a time, they may be steered to the same output (corresponding to column Z of Table 3) by, for example, an optical device 36 (FIG. 3), without interference.

A comparison of the operation of device 70 and Table 3 reveals that device 70 implements a OR logic operation. Referring to the first row of Table 3, when A=0 and B=0 (i.e., control input to retarder 71 is 0), Z=0 (either beam 72 or beam 57, whichever is present, is a L0; in this case, beam 72 is present and is a L0). Referring to the second row of Table 3, when A=0 and B=1 (i.e., control input to retarder 71 is 1), Z=1 (i.e., either beam 72 or beam 57, whichever is present, is a L1; in this case beam 72 is present and is a L1). Referring to the third row of Table 3, when A=1 and B=0, Z=1 (i.e., either beam 72 or beam 57, whichever is present, is a L0; in this case beam 57 is present and is a L1). Finally, referring to the fourth row of Table 3, when A=1 and B=1, Z=1 (i.e., either beam 72 or beam 57, whichever is present, is a L1; in this case beam 57 is present and is a L1).

Figure 8:
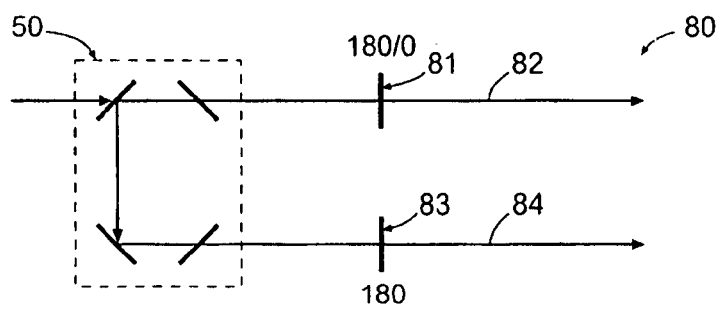
FIG. 8 illustrates an embodiment of a NOR gate implementation.

A NOR gate may be designed based on the OR gate 70 and an inverter or using only NAND gates 60. FIG. 8 illustrates an alternative embodiment of a NOR gate 80 based on the principles of the present invention. Table 4 illustrates a truth table for an NOR gate. Column A may represent an optical input and column B may represent a control input to the OR gate.

TABLE 4

| A | B | Z |
|---|---|---|
| 0 | 0 | 1 |
| 0 | 1 | 0 |
| 1 | 0 | 0 |
| 1 | 1 | 0 |

Beams 56 and 57 produced by the components of processing block 50 of FIG. 5, are similarly produced in NOR gate 80. Beam 56 of FIG. 8 is further processed by a retarder 81 that is controlled by a control input, which corresponds to input B in Table 4 to produce beam 82. Retarder 81 rotates the relative polarization angle of beam 56 by 180° if the control input is L0 and by 0° if the control input is L1. Beam 57 of FIG. 6 is further processed by an un-controlled/inactive retarder 61 that rotates the relative polarization angle of beam 56 by 180° to produce beam 84. As with AND gate 500, because either, but not both, the beam 82 or beam 84 will exist at a time, they may be steered to the same output (corresponding to column Z of Table 4) by, for example, an optical device 36 (FIG. 3), without interference. A comparison of the operation of device 80 and Table 4 reveals that device 60 implements a NOR logic operation.

Figure 9:
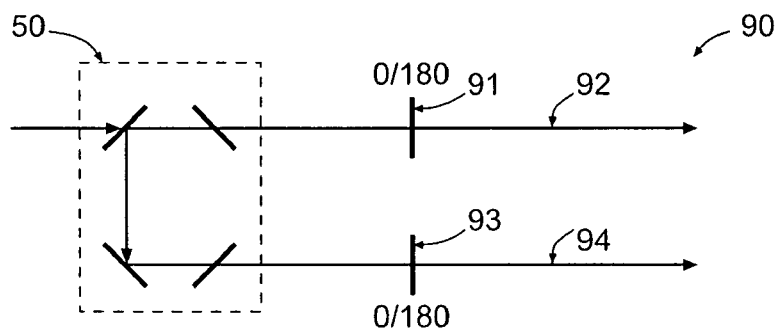
FIG. 9 illustrates an embodiment of a XOR gate implementation.

An XOR gate may be designed based on the AND gate 500 or OR gate 70 along with inverters, using only NAND gates 60 or only NOR gates 80. FIG. 9 illustrates an alternate embodiment of a XOR gate 90 based on the principles of the present invention. Table 5 illustrates a truth table for a XOR gate. Column A may represent an optical input and column B may represent a control input to the XOR gate.

TABLE 5

| A | B | Z |
|---|---|---|
| 0 | 0 | 0 |
| 0 | 1 | 1 |
| 1 | 0 | 1 |
| 1 | 1 | 0 |

Beams 56 and 57 produced by the components of processing block 50 of FIG. 5, are similarly produced in XOR gate 90. Beam 56 of FIG. 9 is further processed by a retarder 91 that is controlled by a control input, which corresponds to input B in Table 5 to produce beam 92. Retarder 91 rotates the relative polarization angle of beam 56 by 0° if the control input is L0 and by 180° if the control input is L1. Beam 57 of FIG. 9 is further processed by a retarder 93, which may be controlled by the same control input for retarder 91, to produce beam 94. As with AND gate 500, because either, but not both, the beam 92 or beam 94 will exist at a time, they may be steered to the same output (corresponding to column Z of Table 5) by, for example, an optical device 36 (FIG. 3), without interference. A comparison of the operation of device 90 and Table 5 reveals that device 90 implements a XOR logic operation.

Figure 11:
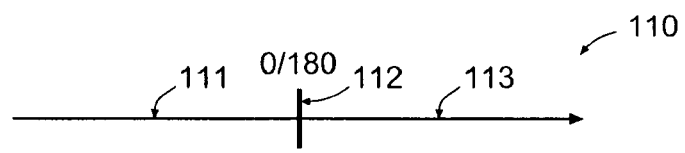
FIG. 11 illustrates another embodiment of a XOR gate implementation.

As shown in FIG. 9, retarders 91 and 93 are identical and, therefore, the XOR gate may be simplified as shown in FIG. 11.

Figure 10:
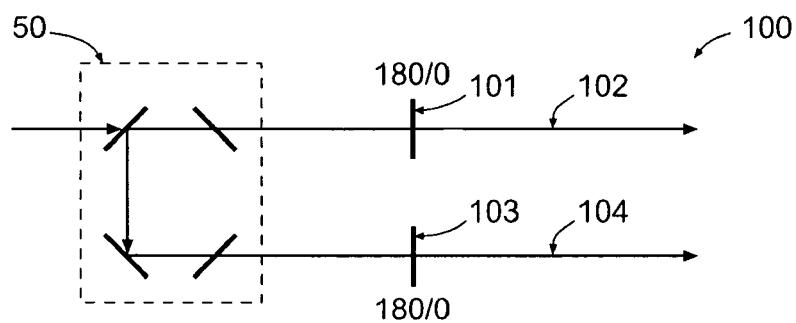
FIG. 10 illustrates an embodiment of a XNOR gate implementation.

As with the XOR gate, the XNOR gate can be constructed using the AND gate 500 or OR gate 72 along with inverters, using only NAND gates 60 or only NOR gates 80. FIG. 10 illustrates an alternative embodiment of a XNOR gate 100 based on the principles of the present invention. Table 6 illustrates a truth table for a XNOR gate. Column A may represent an optical input and column B may represent a control input to the XOR gate.

TABLE 6

| A | B | Z |
|---|---|---|
| 0 | 0 | 1 |
| 0 | 1 | 0 |
| 1 | 0 | 0 |
| 1 | 1 | 1 |

Beams 56 and 57 produced by the components of processing block 50 of FIG. 5, are similarly produced in XNOR gate 100. Beam 56 of FIG. 10 is further processed by a retarder 101 that is controlled by a control input, which corresponds to input B in Table 6, to produce beam 102. Retarder 101 rotates the relative polarization angle of beam 56 by 180° if the control input is L0 and by 0° if the control input is L1. Beam 57 of FIG. 9 is further processed by a retarder 103, which may be controlled by the same control input for retarder 101, to produce beam 104. As with AND gate 500, because either, but not both, the beam 102 or beam 104 will exist at a time, they may be steered to the same output (corresponding to column Z of Table 6) by, for example, an optical device 36 (FIG. 3), without interference. A comparison of the operation of device 100 and Table 6 reveals that device 100 implements a XOR logic operation.

Figure 12:
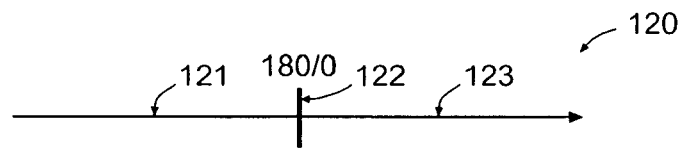
FIG. 12 illustrates another embodiment of a XNOR gate implementation.

As shown in FIG. 10, retarders 101 and 103 are identical and, therefore, the XNOR gate may be simplified as shown in FIG. 12.

In FIGS. 5-12, a linearly polarized light at a polarization angle of +45° is used to represent L1 and a linearly polarized light at a polarization angle of −45° is used to represent L0.

However, any general state of polarization of the light beam represented by the $\rho$ vector, $|\rho| \llcorner \theta°$, may be used to represent L1 an its orthogonal polarization state represented by a vector of magnitude $1/|\rho|$ with a 180° phase shift may be used to represent L0. This general logic level representation maybe used to design logic gates such as the gates in FIG. 5-12

Figure 13:
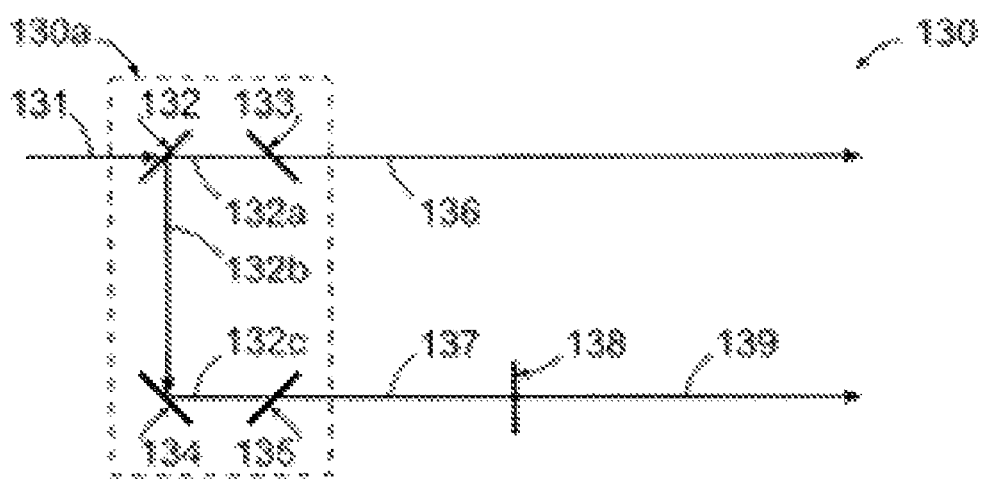
FIG. 13 illustrates another embodiment of an AND gate implementation.

FIG. 13 illustrates an embodiment of an AND gate 130 using the general logic lever representation. AND gate 130 operates in a similar manner as AND gate 500, except polarizers 53, 55 of FIG. 5 are replaced with general elliptical polarizers 133, 135, respectively, where polarizer 133 and 135 are orthogonal. Additionally, retarder 58 of FIG. 5 is replaced with a controlled elliptical polarizer 138, which scales the relative amplitude of beam 137 by $1/|\rho|^2$ and rotates the relative polarization angle of beam 137 by 180° if the control input is L0 and preserves the polarization of beam 137 if the control input is L1.

Any Boolean expression can be designed and implemented using the gates discussed in the previous sections along with the well established design rules of digital logic. Additionally, any Boolean expression can be designed and implemented using a single device general processor based on the design methodology of the present invention, which may be programmed into a software design program to run on any general purpose computer.

To further explain the principles of the invention, constant-$\Delta$ and the constant-$\psi$ designs of XOR and XNOR gates will be described using the complex $\rho$ plane and a pair of the optical devices TFS1 and TFS2, for example, elements 22, 24, respectively of FIG. 2.

Figure 14:
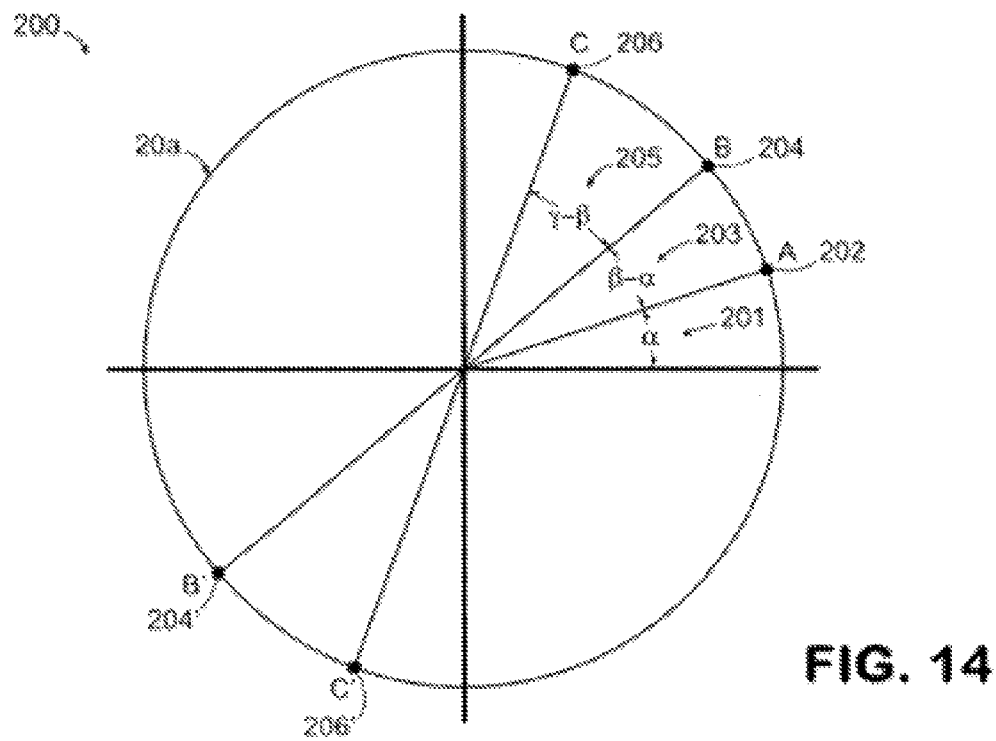
FIG. 14 illustrates the complex p plane representation of a TES R-gate.

A constant-$\psi$ design may be represented by a retarder (R) gate. FIG. 14 illustrates an incoming laser (for example 12 of FIG. 1) having a relative polarization angle of $\alpha$, which is represented by point A (202) on the unit circle 20a. The second step is to determine the two polarization states representing the laser 23, 25 after each of the two film-thickness systems TFS1 22 and TFS2 24 of FIG. 2, which are represented by point B 204 for $L1_1$, $\Delta=\beta$, and point C 206 for $L1_2$, $\Delta=\gamma$, respectively. Accordingly, $L0_1 \equiv \beta+180°$ and $L0_2 \equiv \gamma+180°$ (the value of $\Delta$); orthogonal to the $\beta$ and $\gamma$ polarization states, respectively. Those two polarization states are represented by points $\bar{B}$ and $\bar{C}$, respectively.

The third step is to determine the two polarization states representing each of the two reflections at TFS1 and TFS2 themselves. That is achieved through a quick study of the operation of the gate. For the operation of the gate, the laser's state of polarization A is first to be transformed into the state of polarization B or $\bar{B}$ representing $L1_1$ or $L0_1$, respectively, by interacting with TFS1 in either of its two controlled states 1 or 0, respectively. The state of polarization of the emerging beam from TFS1 is changed upon interaction with TFS2 in either of its two controlled states of 1 or 0. That interaction leads to a transformed polarization state of either C or $\bar{C}$, depending on the controlled states of TFS2. Table 1 gives the truth table of the R-gate type of FIG. 4, which is clearly that of an XOR gate. Note that in generating Table 1, we use the starting point as point A and use the phase information we just discussed to determine the resultant transformations. Note also that vector multiplication is reduced to phase addition; magnitudes of both vectors are unity. Table 8 shows the obtained respective design parameters (transformations) of TFS1 and TFS2. Note that the transformations are obtained by use of a retarder of any type.

TABLE 10

| A | TFS1 | B | TFS2 | C | | | |
|---|---|---|---|---|---|---|---|
| $\alpha$ | $\beta - \alpha + 180°$ | $\beta - 180°$ | $\gamma - \beta$ | $\gamma + 180°$ | 0 | 0 | 0 |
| $\alpha$ | $\beta - \alpha + 180°$ | $\beta + 180°$ | $\gamma - \beta + 180°$ | $\gamma$ | 0 | 1 | 1 |
| $\alpha$ | $\beta - \alpha$ | $\beta$ | $\gamma - \beta$ | $\gamma$ | 1 | 0 | 1 |
| $\alpha$ | $\beta - \alpha$ | $\beta$ | $\gamma - \beta + 180°$ | $\gamma + 180°$ | 1 | 1 | 0 |

TABLE 11

| | L1 | L0 |
|---|---|---|
| TFS1 | $\beta - \alpha$ | $(\beta - \alpha) + 180°$ |
| TFS2 | $(\gamma - \beta) + 180°$ | $\gamma - \beta$ |

The following is an easy to follow step-by-step algorithm to do the design as discussed above. First, fill in columns A, B, and C with the info from FIG. 14, corresponding to 0's and 1's of the truth table of the gate. Then, fill in column TFS1 by finding the difference B−A. Then, fill in column TFS2 by finding the difference C−B. Then, identify the 0's and 1's corresponding to TFS1 and TFS2; transformations. Finally, construct the gate-design table.

To design a general XNOR R-gate, we can do either of three things. First, we can simply invert one of the inputs of the XOR gate discussed above by an inverter. Second, we can invert the output of the XOR gate by an inverter. For those two cases, an inverter is simply a TFS that produces a relative phase shift of 180° without producing any relative amplitude attenuation, simply a retarder. The above two cases amount to having the retarder at the input, output, in the middle, or even switching the corresponding 1 and 0 of one of the two electronic control inputs with respect to the associated TFS retardation of Table 11.

Third, we use the algorithm of the previous subsection to design the gate. Tables 12 and 13 are the gate-design table and the gate parameters table, respectively.

TABLE 12

| A | TFS1 | B | TFS2 | C | | | |
|---|---|---|---|---|---|---|---|
| $\alpha$ | $\beta - \alpha + 180°$ | $\beta + 180°$ | $\gamma - \beta + 180°$ | $\gamma$ | 0 | 0 | 1 |
| $\alpha$ | $\beta - \alpha + 180°$ | $\beta + 180°$ | $\gamma - \beta$ | $\gamma + 180°$ | 0 | 1 | 0 |
| $\alpha$ | $\beta - \alpha$ | $\beta$ | $\gamma - \beta + 180°$ | $\gamma + 180°$ | 1 | 0 | 0 |
| $\alpha$ | $\beta - \alpha$ | $\beta$ | $\gamma - \beta$ | $\gamma$ | 1 | 1 | 1 |

TABLE 13

| | L1 | L0 |
|---|---|---|
| TFS1 | $\beta - \alpha$ | $(\beta - \alpha) + 180°$ |
| TFS2 | $(\gamma - \beta)$ | $(\gamma - \beta) + 180°$ |

To cascade any number of the R-gates together, the L1 and L0 are to be the same at the input and output of the gates. The general gate designed above does not satisfy this condition. Therefore, we have a different design for the subsequent (S) gates; the cascading design. For that S-gate, the input laser beam is the output of the first gate, or any other S gate. That is a polarization state of either C or Ć. Therefore, TFS1 of the gate should produce an uncontrolled retardation of −(γ−β), FIGS. 2 and 14. TFS2 of the gate should produce the controlled retardation of γ−β, as before. This S-gate design can be indefinitely cascaded. Operation and truth tables similar to Tables 11-14 are easily generated for the S-gates. They are not presented here.

Again, as we discussed above, we have two major special types of the TES gate architecture; the constant-Δ and the constant-ψ designs. In the previous section, we discussed the simplest of the constant-ψ designs, which is the R-gate. Now, we discuss the simplest of the constant-Δ designs, which is the linear-partial polarizer (LPP) gate.

As we discussed above, the design of any general logic gate starts with the choice of the state of polarization representing the incoming Laser. For the LPP-gate, it is represented in the complex ρ-plane by a general point A on the real axis, tan ψ=α, where α now is the distance 0A from the origin, FIG. 5. The second step is to select the two polarization states represented by the general points B for $L1_1=\beta$ and C for $L1_2=\gamma$. Similarly, β(γ) is the distance 0B (0C). Accordingly $L0_1=0\acute{B}$ and $L0_2=0\acute{C}$; orthogonal to the β and γ polarizations, respectively. Those two polarization states are represented by points $\acute{B}$ and $\acute{C}$, where $0\acute{B}=1/0B$ and $0\acute{C}=1/0C$, respectively.

Using the algorithm disclosed above and using division instead of subtraction, we derive Tables 15 and 16.

TABLE 15

| A | TFS1 | B | TFS2 | C | | | |
|---|---|---|---|---|---|---|---|
| $\alpha$ | $1/\beta\alpha \llcorner 180°$ | $1/\beta \llcorner 180°$ | $\beta/\gamma$ | $1/\gamma \llcorner 180°$ | 0 | 0 | 0 |
| $\alpha$ | $1/\beta\alpha \llcorner 180°$ | $1/\beta \llcorner 180°$ | $\gamma\beta \llcorner 180°$ | $\gamma$ | 0 | 1 | 1 |
| $\alpha$ | $\beta/\alpha$ | $\beta$ | $\gamma/\beta$ | $\gamma$ | 1 | 0 | 1 |
| $\alpha$ | $\beta/\alpha$ | $\beta$ | $1/\gamma\beta \llcorner 180°$ | $1/\gamma \llcorner 180°$ | 1 | 1 | 0 |

TABLE 16

| | L1 | L0 |
|---|---|---|
| TFS1 | $\beta/\alpha$ | $1/\alpha\beta \llcorner 180°$ |
| TFS2 | $\gamma\beta \llcorner 180°$ and $1/\gamma\beta \llcorner 180°$ | $\beta/\gamma$ and $\gamma/\beta$ |

Table 16 gives the design parameters for TFS1 and TFS2 for the two controlled states of each. Note that the transformations of Table 15 transform a linearly polarized light to a linearly polarized light with a different value of P. That is achieved by a linear partial polarizer TFS or electro-optically using a liquid crystal.

By closely inspecting Table 15, we recognize the fact that the TFS1 design is physically correct; same required 0's and same required 1's. But for TFS2, the design is not physically correct, because it requires two different 0's and two different 1's. To have only one state of 0 (1), we equate the two; β/γ=γ/β (γβ⌐180°=1/γβ⌐180°). Both lead to γ=β=±1. Therefore, regardless of the position of point A, B=C=(+1, 0) and B'=C'= (−1, 0), or vice versa. A second limiting case is of the two points of 0 and ∞, which is discussed below.

As before, to design a general XNOR LPP-gate, we can do either of three things. First, we can simply invert one of the inputs of the XOR gate discussed above by an inverter. Second, we can invert the output of the XOR gate by an inverter. For those two cases, an inverter is simply a TFS that produces a relative amplitude attenuation of γ+(1/γ) without producing any phase shift, simply an LPP, which is actually equivalent to 180° phase shift for the limiting case discussed in the previous subsection; (+1, 0) and (−1, 0). The above two cases amount to having the LPP at the input or output, in the middle, or even switching the corresponding 1 and 0 of one of the two electronic control inputs with respect to the associated TFS retardation of Table 6. Tables similar to Tables 5 and 6 can be similarly generated using the same algorithm discussed above.

For the sake of conciseness, we do not repeat the discussion related to the cascading of the R gates. A similar discussion holds for an LPP gate, with proper referencing to points A, B, and C of FIG. 15.

Limiting the LPP gate design to completely identical 0's and 1's led to the limiting case of B=C. We can do the design with a relaxed condition on the 0's and 1's, where we define the 0's as of a phase of ∟180° with no restrictions on the magnitude, and the 1's as of a phase of ∟0° also with no restrictions on the magnitude. That allows for more degrees of freedom in the design process, and affords the opportunity to use the magnitude to carry independent information that can be utilized for testing, logic, or reversible logic designs. That's to be discussed in a separate publication.

Figure 15:
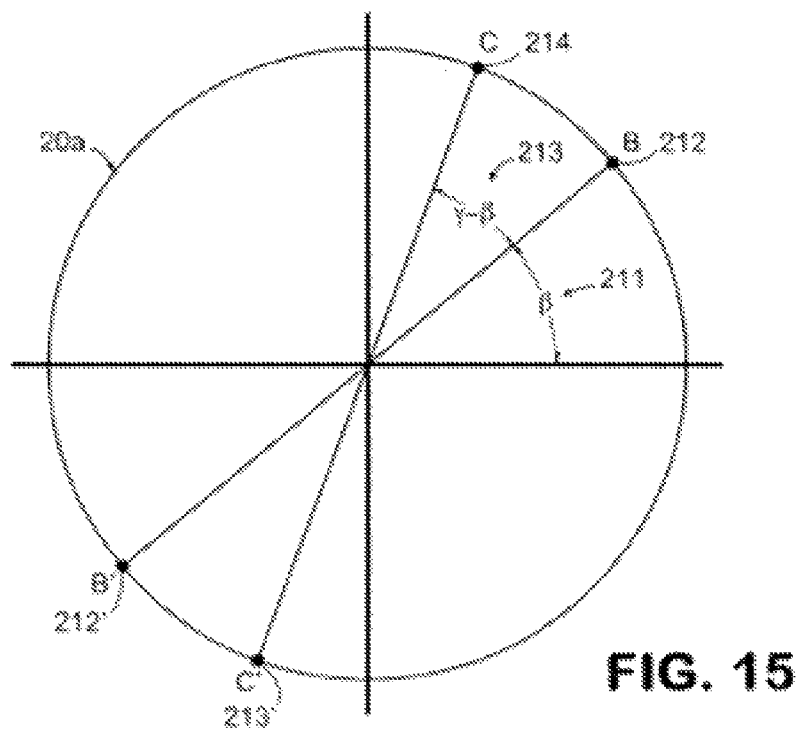
FIG. 15 illustrates the complex p plane representation of the TES S-gate.
Figure 16:
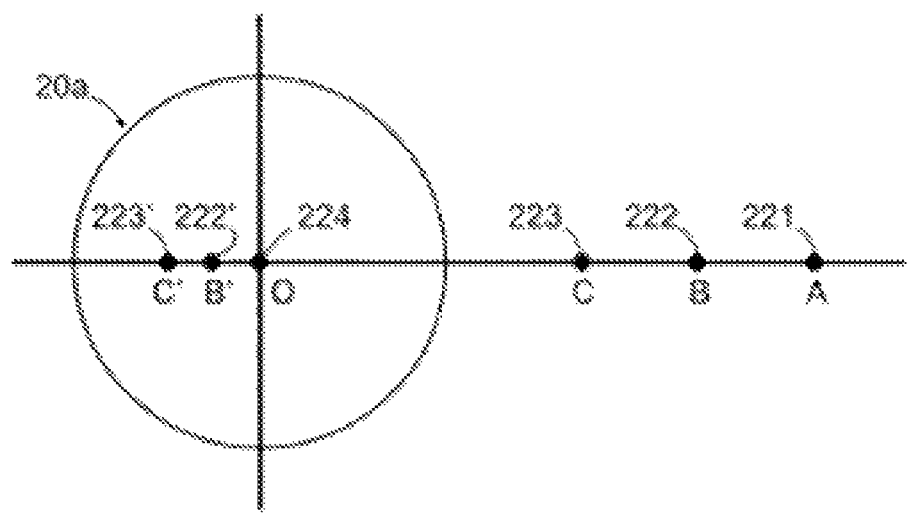
FIG. 16 illustrates the complex p plane representation of the TES LPP-gate.

From the above discussions, it becomes evident that combining points A and B, FIGS. 14 and 15, to represent the logic state of the laser beam provides an elegant design architecture. In this case the laser beam carries the information within the optical system as an input and output for the gate(s), in addition to being one of the controls of the gate. The second control is an electronic one, hence the single-electronic-signal (SES) gate architecture. Now, in FIG. 16 the laser beam logic states 1 and 0 are represented by the polarization states B and Ḃ and that leaving the single TFS is represented by the polarization states of C and Ć. It is easy to obtain the truth table for the SES gate architecture using the same algorithm used before and recognize that it is that of an XOR gate. XNOR gates are obtained in a similar fashion as before, simply by an inversion or a redesign.

Cascading of the gates is evident in this architecture. The output polarization states are either C or Ć, where the input is always B or Ḃ. Accordingly, a second uncontrolled TFS is introduced at the output of the gate, or at the input, to return the polarization states to B or Ḃ, as we discussed above.

The single-reflection single-electronic-signal (SRSES) gate architecture is achieved by making points B and C, and hence Ḃ and Ć, coincide together. That way, the input and output beams have the same L1 and L0 polarization state representation of C and Ć, respectively. In this case, cascading the gates does not require any additional manipulation of the beam, and we only have one kind of gate for each type; the S-gate design is not needed. That holds for both gate types, R and LPP.

Figure 17:
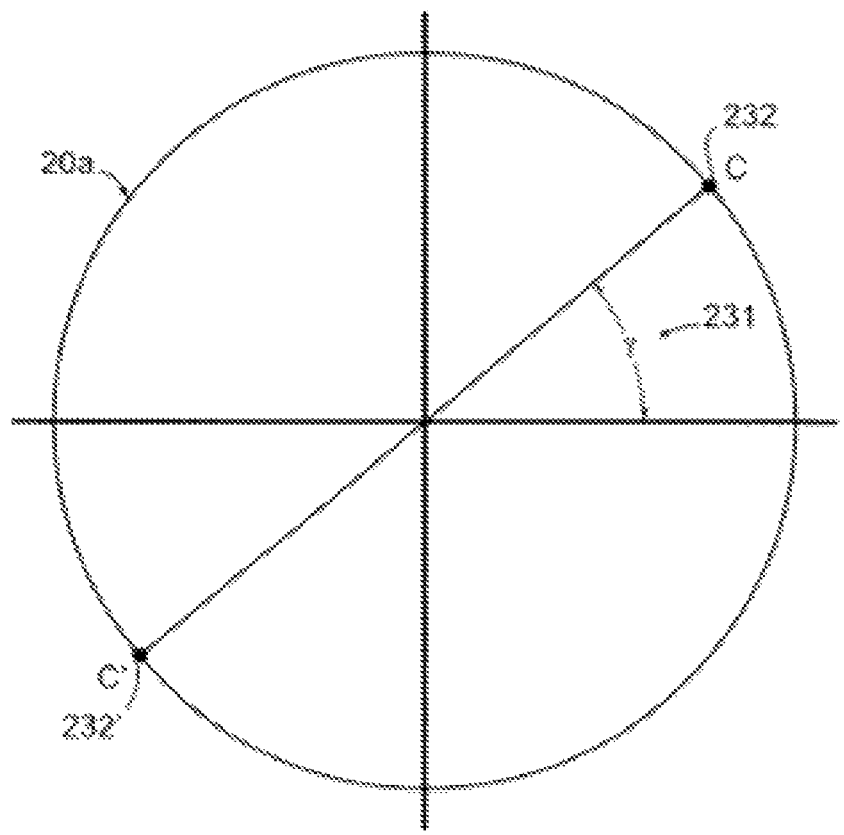
FIG. 17 illustrates the complex p plane representation of the single-reflection single-electronic-signal (SRSES) R-gate architecture.

For the R gate, Tables 17 and 18 give the gate-design and operation table, and the retardation of the TFS, refer to FIG. 17. It is clear from Table 17 that the gate is an XOR one.

TABLE 17

| LBI | TFS | LBO | | | |
|---|---|---|---|---|---|
| γ + 180° | 0 | γ + 180° | 0 | 0 | 0 |
| γ + 180° | 180° | γ | 0 | 1 | 1 |
| γ | 0 | γ | 1 | 0 | 1 |
| γ | 180° | γ + 180° | 1 | 1 | 0 |

TABLE 18

| | 1 | 0 |
|---|---|---|
| TFS | 180° | 0 |

As we discussed before, XNOR gates of this design can easily be achieved.

Figure 18:
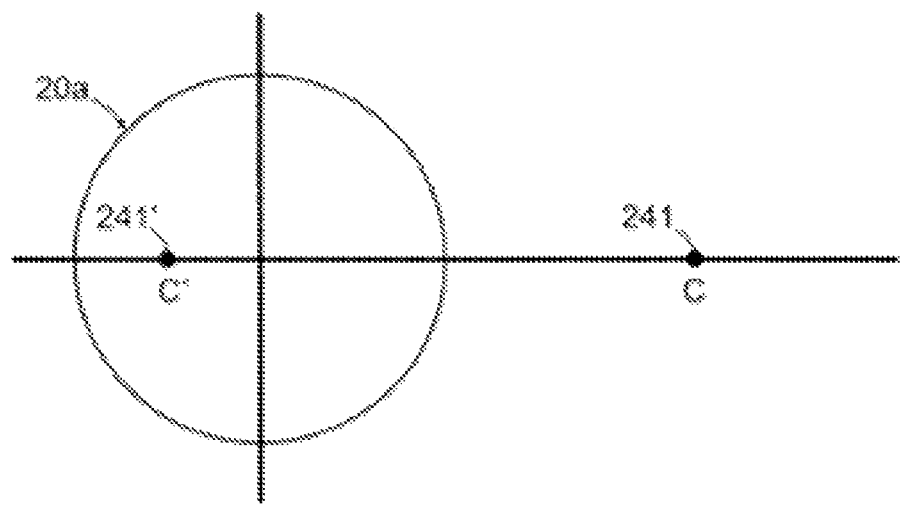
FIG. 18 illustrates the complex p plane representation of the single-reflection single-electronic-signal (SRSES) LPP-gate architecture.

For the SRSES-architecture LPP-gate, FIG. 18 gives the gate polarization-state representation. Tables 19 and 20 give the gate-design and operation, and retardation of the TFS.

Note from Table 19 that the TFS logic 1 is either of magnitude $\gamma^2$ and relative phase angle 180° or of magnitude $1/\gamma^2$ and of the same relative phase angle. On the other hand, for a TFS to produce this logic one operation it requires a condition of γ=1, for the operation to hold correct; SRSES architecture. That means, C and Ć and are both on the unit circle; points (+1, 0) and (−1, 0), respectively. That special case is to be discussed in the following subsection. It is clear from Table 19 that the gate is an XOR one.

TABLE 19

| LBI | TFS | LBO | | | |
|---|---|---|---|---|---|
| 1/γ ∟180° | 1 | 1/γ ∟180° | 0 | 0 | 0 |
| 1/γ ∟180° | $\gamma^2$ ∟180° | γ | 0 | 1 | 1 |
| γ | 1 | γ | 1 | 0 | 1 |
| γ | $1/\gamma^2$ ∟180° | 1/γ ∟180° | 1 | 1 | 0 |

TABLE 20

| | 1 | 0 |
|---|---|---|
| TFS | $\gamma^2$ ∟180° and $1/\gamma^2$ ∟180° | 0 |

As we discussed before, XNOR gates of this design can easily be achieved.

A second case for the γ condition to be satisfied, is the limiting case where γ=0 or ∞. That leads to the special case of p-polarized and s-polarized waves as our L1 and L0, which is the only case reported and discussed in the literature. This case is also discussed in the following subsections.

Figure 19:
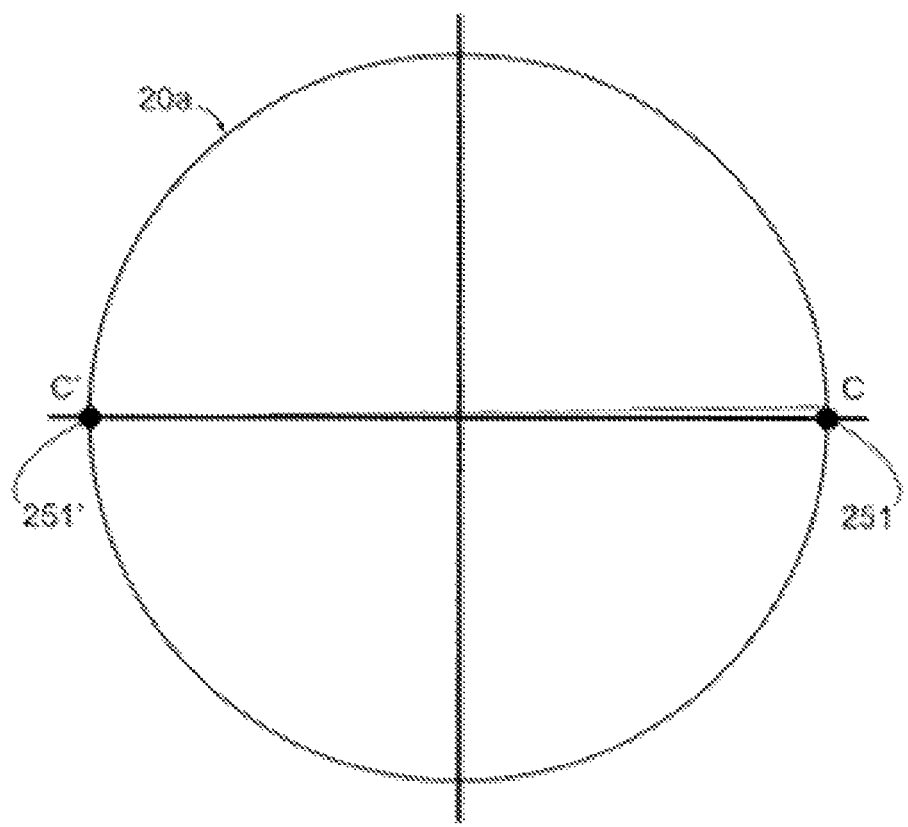
FIG. 19 illustrates the complex p plane representation of the R and LPP-gate.

FIG. 19 illustrates the special case of C and Ć and coinciding with the points (+1, 0) and (−1, 0), respectively, is an intersection case between the R and LPP designs. Point (+1, 0) represents a state of polarization of a linearly polarized light at +45°. At the same time, it represents a TFS that produces a relative amplitude attenuation of one and a zero relative phase shift, a PPD device. It is both a retarder and an LPP. On the other hand, point (−1, 0) represents a state of polarization of a linearly polarized light at −45°. It also represents a TFS that produces a relative amplitude attenuation of one and a relative phase shift of ±180°. Also, it is both a retarder and an LPP.

Tables 21 and 22 give the gate-design and operation, and the TFS functions of the gate. As can be clearly seen from both tables, the truth table of the gate in this case is that of an XOR. XNOR is easily obtained as discussed before.

TABLE 21

| LBI | TFS | LBO | | | |
|---|---|---|---|---|---|
| 180° | 0° | 180° | 0 | 0 | 0 |
| 180° | 180° | 0° | 0 | 1 | 1 |
| 0° | 0° | 0° | 1 | 0 | 1 |
| 0° | 180° | 180° | 1 | 1 | 0 |

TABLE 22

| | 1 | 0 |
|---|---|---|
| TFS | 180° | 0° |

The linearly-polarized light at 0 and 90° is the limiting case of the LPP gate. The two polarization states are represented by the origin and the point at infinity, respectively. It is directly derived that L1 is the s-polarized light (90° polarization state) and that L0 is the p-polarized light (0 polarization state), or visa versa. L1 of the controlled signal is a rotation of 90° and that of the L0 state is a rotation of 0°, no action or a PPD. That gives an XOR gate. An XNOR gate is simply devised as discussed before.

Also, cascading of such gates is evident with no additional requirements. As mentioned before, that is the only case on polarization-based logic representation previously reported in the literature.

The architecture of an inverter gate is very simple. In the general case, it is a single TFS that produces 180° relative phase shift and a relative amplitude attenuation of the reciprocal of the state of polarization tan $\psi$. In the R-gate and LPL45 architectures, the inverter TFS is to induce only a 180° relative phase shift and no relative amplitude attenuation.

It is important to realize that cascading any of the above discussed optical gate architectures is not sequential in time. It is simultaneous cascading. Therefore, all electronic signals are to be input simultaneously and the laser output-input delay is determined by the speed of light. With today's manufacturing capabilities, and the nanotechnology moving into a more mature stage, delays in the order of femto seconds are achievable. That leads to bandwidths of several orders of magnitude of what is possible today.

Also, it is important to note that multiple input architectures are straight forward from the discussed two-input designs. They are not discussed in this communication to limit the size of the paper.

In addition, integrated optical architecture (IOA) is where any number of Boolean statements of XOR, XNOR, and Inverter operations is involved. IOA can be directly implemented using an integrated architecture that is the subject of a separate publication. For example an IOA can be designed to do switching, demultiplexing, or parity checking, to mention a few applications.

The gates can be cascaded independently or internally. Gates that has more than 2 inputs can be designed by adding one extra retarder for each extra input. A gate that satisfies the Boolean function A XOR B XOR C can be represented by 2 retarders and one polarizer. The polarizer will produce linearly polarized light at +45 and −45 representing the input 0 and 1 respectively, while $\rho 1$ and $\rho 2$ logic 1 will be at angle 0 and logic zero will be at an angle of 180 in the $\rho$ plane. On the other hand, the Boolean expression A XOR B XNOR C will be very similar to the latter, but it requires an inverter to be added after the output of the first retarder, and $\rho 2$ logic 0 and 1 must be interchanged. As illustrated, multiple input Boolean expressions that rely on XOR, XNOR, Inverters or any combination of the latter can be easily cascaded by adding an extra layer or layers of thin film.

At the end of the whole cascaded system, or at the end of each gate the output can be easily identified and turned into an electric signal. For the simple case that is deigned to produce linearly polarized output at +45 and −45 degrees, a thin film based system can be design to maximize the transmission or reflection of one case while minimizing the other. The latter in conjunction with the use a simple photodetector allows the photodetector to produce an electric output of high reading representing logic 1, and low reading representing 0. The latter allows for the integration of the new optical binary logic implementation with the current semiconductor based binary logic systems. Such integration at the input and the output provides great versatility for the new optical device, and allows the creation of hybrid technology that utilizes the advantages of the new system, without greatly altering current designs. Furthermore, communication between optical based devices and semiconductor based devices will not face any complications.

As described above and as will be appreciated by one skilled in the art, embodiments of the present invention may be configured as a method or apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatus and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, principles of the invention can be used to design any logic gate of any type, with any truth table, and for any purpose, including gates that have yet to be designed.

Therefore, it is to be understood that the inventions are not to be limited to the specific embodiments disclosed and that modifications and other embodiments are intended to be included within the scope of the appended claims. Furthermore, it is understood that in the practical implementation of optical devices error may occur that results in errors. For example, beams 52*a*, 52*b*, and 52*c* of FIG. 5 may not be identical, or as an additional example, beams 56 and 57 may not be completely eliminated when required. However, it is understood that some margin of error is tolerable or may be corrected with additional device to operate the devices discloses as intended.

Although specific terms are employed herein, they are used in a generic and descriptive sense only and not for purposes of limitation.

That which is claimed:

1. A method comprising:
    splitting an input polarized beam into a first beam and a second beam, wherein the first beam and the second beam have an identical or nearly identical relative polarization angle that equals or nearly equals the relative polarization angle of the input polarized beam;
    polarizing at a first relative polarization angle the first beam; and
    polarizing at a second relative polarization angle the second beam;
    wherein the ratio of the amplitudes of two perpendicular polarization components of the input polarized beam is one or nearly one;
    wherein the difference between the first relative polarization angle and the second relative polarization angle is 180 degrees or nearly 180 degrees; and
    wherein the relative polarization angle of the input polarized beam equals or nearly equals either the first relative polarization angle or the second relative polarization angle.

2. The method of claim 1, wherein polarizing the first beam or polarizing the second beam generates no beam or a nearly inexistent beam.

3. The method of claim 1, further comprising:
    shifting by zero or 180 degrees based on a control input the phase between two perpendicular polarization components of any resulting beam generated from polarizing the second beam.

4. The method of claim 3, wherein the first relative polarization angle represents a first logic state and the second relative polarization angle represents a second logic state, the method further comprising:
    shifting by 180 degrees the phase between two perpendicular polarization components of any resulting beam generated from polarizing the second beam when the control input corresponds to the first logic state.

5. The method of claim 4, further comprising:
    steering any resulting beam generated from polarizing the first beam and any resulting beam generated from polarizing and shifting the second beam to the same point.

6. The method of claim 3, further comprising:
    shifting by 180 degrees the phase between two perpendicular polarization components of any resulting beam generated from polarizing the first beam.

7. The method of claim 6 wherein the first relative polarization angle represents a first logic state and the second relative polarization angle represents a second logic state, the method further comprising:
    shifting by 180 degrees the phase between two perpendicular polarization components of any resulting beam generated from polarizing the second beam when the control input corresponds to the second logic state.

8. The method of claim 7, further comprising:
    steering any resulting beam generated from polarizing and shifting the first beam and any resulting beam generated from polarizing and shifting the second beam to the same point.

9. The method of claim 1, further comprising:
    shifting by zero or 180 degrees based on a control input the phase between two perpendicular polarization components of any resulting beam generated from polarizing the first beam.

10. The method of claim 9, wherein the first relative polarization angle represents a first logic state and the second relative polarization angle represents a second logic state, the method further comprising:
    shifting by 180 degrees the phase between two perpendicular polarization components of any resulting beam generated from polarizing the first beam when the control input corresponds to the second logic state.

11. The method of claim 10, further comprising:
    steering any resulting beam generated from polarizing and shifting the first beam and any resulting beam generated from polarizing the second beam to the same point.

12. The method of claim 9, further comprising:
    shifting by 180 degrees the phase between two perpendicular polarization components of any resulting beam generated from polarizing the second beam.

13. The method of claim 12, wherein the first relative polarization angle represents a first logic state and the second relative polarization angle represents a second logic state, the method further comprising:
    shifting by 180 degrees the phase between two perpendicular polarization components of any resulting beam generated from polarizing the first beam when the control input corresponds to the first logic state.

14. The method of claim 13, further comprising:
    steering any resulting beam generated from polarizing and shifting the first beam and any resulting beam generated from polarizing and shifting the second beam to the same point.

15. The method of claim 1, further comprising:
    shifting by zero or 180 degrees based on a first control input the phase between two perpendicular polarization components of any resulting beam generated from polarizing the first beam; and
    shifting by zero or 180 degrees based on a second control input the phase between two perpendicular polarization components of any resulting beam generated from polarizing the second beam.

16. The method of claim 15 where the first control input and the second control input are the same.

17. The method of claim 15, wherein the first relative polarization angle represents a first logic state and the second relative polarization angle represents a second logic state, the method further comprising:
    shifting by 180 degrees the phase between two perpendicular polarization components of any resulting beam generated from polarizing the first beam when the first control input corresponds to the second logic state; and
    shifting by 180 degrees the phase between two perpendicular polarization components of any resulting beam generated from polarizing the second beam when the second control input corresponds to the second logic state.

18. The method of claim 15, further comprising:
    steering any resulting beam generated from polarizing and shifting the first beam and any resulting beam generated from polarizing and shifting the second beam to the same point.

19. The method of claim 15, wherein the first relative polarization angle represents a first logic state and the second relative polarization angle represents a second logic state, the method further comprising:
- shifting by 180 degrees the phase between two perpendicular polarization components of any resulting beam generated from polarizing the first beam when the first control input corresponds to the first logic state; and
- shifting by 180 degrees the phase between two perpendicular polarization components of any resulting beam generated from polarizing the second beam when the second control input corresponds to the first logic state.

20. The method of claim 19, further comprising:
- steering any resulting beam generated from polarizing and shifting the first beam and any resulting beam generated from polarizing and shifting the second beam to the same point.

21. An apparatus comprising:
- means for splitting an input polarized beam into a first beam and a second beam, wherein the first beam and the second beam have an identical or nearly identical relative polarization angle that equals or nearly equals the relative polarization angle of the input polarized beam;
- means for polarizing at a first relative polarization angle the first beam; and
- means for polarizing at a second relative polarization angle the second beam;
- wherein the ratio of the amplitudes of two perpendicular polarization components of the input polarized beam is one or nearly one;
- wherein the difference between the first relative polarization angle and the second relative polarization angle is 180 degrees or nearly 180 degrees; and
- wherein the relative polarization angle of the input polarized beam equals or nearly equals either the first relative polarization angle or the second relative polarization angle.

* * * * *